(12) United States Patent
Sakabe et al.

(10) Patent No.: US 7,064,276 B2
(45) Date of Patent: Jun. 20, 2006

(54) COMMUNICATION CABLE, AND COMMUNICATION WIRE PROTECTING TUBE

(75) Inventors: Itaru Sakabe, Kanagawa (JP); Hisashi Tanji, Kanagawa (JP); Toshiaki Kakii, Kanagawa (JP); Hiroki Ishikawa, Kanagawa (JP); Kazuaki Hamada, Kanagawa (JP); Nobuhiro Akasaka, Kanagawa (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 32 days.

(21) Appl. No.: 10/738,224

(22) Filed: Dec. 18, 2003

(65) Prior Publication Data

US 2005/0098342 A1 May 12, 2005

(30) Foreign Application Priority Data

Dec. 18, 2002 (JP) .......................... P.2002-366349
Dec. 11, 2003 (JP) .......................... P.2003-413905

(51) Int. Cl.
*H01B 7/00* (2006.01)
*H01B 7/36* (2006.01)

(52) U.S. Cl. ................................. 174/110 R; 174/112
(58) Field of Classification Search .................. 174/36, 174/102 R, 107, 106 R, 109, 68.1, 69, 74 R, 174/78.1, 110 R, 110 SR; 138/118, 121–126, 138/129, 137–138, 140, 144, 149
See application file for complete search history.

(56) References Cited

U.S. PATENT DOCUMENTS

| 1,781,574 | A | * | 11/1930 | Frederickson ................ 138/131 |
| 3,682,203 | A | * | 8/1972 | Foti et al. .................... 138/135 |
| 4,278,836 | A | * | 7/1981 | Bingham ................... 174/84 S |
| 4,396,797 | A | * | 8/1983 | Sakuragi et al. ............ 174/68.3 |
| 4,487,232 | A | * | 12/1984 | Kanao ......................... 138/122 |
| 4,754,781 | A | * | 7/1988 | Jan de Putter ................ 138/98 |
| 4,860,797 | A | * | 8/1989 | Richards et al. ............. 138/122 |
| 4,862,924 | A | * | 9/1989 | Kanao ......................... 138/144 |
| 5,627,932 | A | * | 5/1997 | Kiel et al. ................... 385/102 |
| 5,739,472 | A | * | 4/1998 | Buck et al. .................. 174/107 |
| 6,573,451 | B1 | * | 6/2003 | Komiya et al. ............. 174/68.1 |

FOREIGN PATENT DOCUMENTS

| GB | WO 93/09457 | * | 5/1993 |
| JP | 60-77214 | | 5/1985 |

(Continued)

*Primary Examiner*—William H. Mayo, III
(74) *Attorney, Agent, or Firm*—McDermott Will & Emery LLP

(57) ABSTRACT

A communication cable having a communication wire and an armor including at least two synthetic resin layers, and protects the communication wire in a loose state. The communication wire protecting tube includes at least two synthetic resin layers, and inserts the communication wire in a loose state. The most hard resin layer of the armor has a crosswise or spiral annular groove or cut portion continuous in the longitudinal direction to reach the radially inner face, and the outermost layer of the armor is formed of a protective layer made of a softer resin than the hard resin layer. The adjoining edge portions of the annular groove or the cut portion come, when the communication wire is to be bent, into contact with each other so that it may be prevented from being bent to a predetermined or smaller bend radius.

17 Claims, 15 Drawing Sheets

FOREIGN PATENT DOCUMENTS

| | | | |
|---|---|---|---|
| JP | 61-198113 | * | 9/1986 |
| JP | 1-164895 | | 6/1989 |
| JP | 3-40822 | | 8/1991 |
| JP | 7-504757 | | 5/1995 |
| JP | 3028504 | | 6/1996 |
| JP | 63-100910 | | 6/1998 |
| JP | 11-223752 | | 8/1999 |
| WO | WO 93/09457 | | 5/1993 |

* cited by examiner

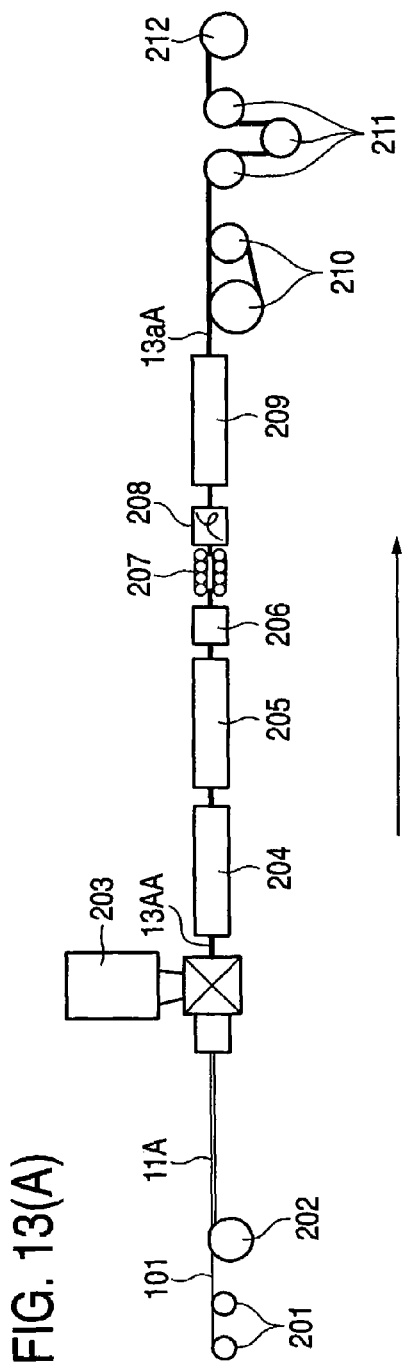
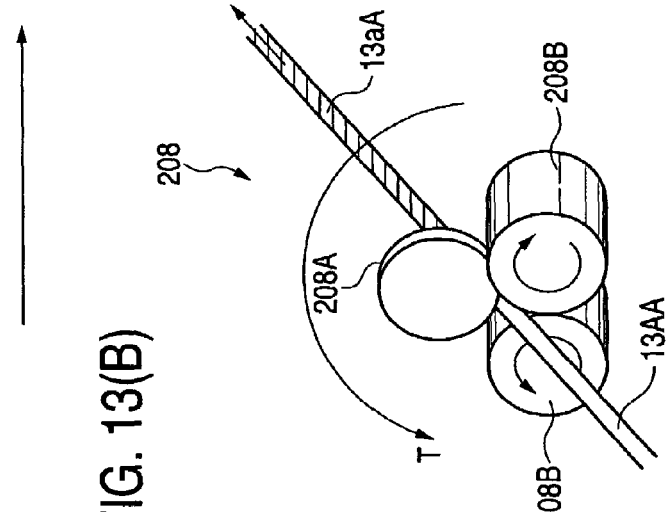
FIG. 13(A)
FIG. 13(B)

COMMUNICATION CABLE, AND COMMUNICATION WIRE PROTECTING TUBE

FIELD OF THE INVENTION

The present invention relates to a communication cable, in which a communication wire such as an optical fiber or a twisted conductor is protected in a loose state or in a contact state by an armor of a synthetic resin, and, more particularly, to a communication cable to be used for an indoor wiring and a protecting tube for inserting the communication wire.

BACKGROUND OF THE INVENTION

For various kinds of information transmission/control, the communication cable is used in a vehicle and a communication device and in a room or the like. As this communication cable, an optical fiber for optical communications or a conductor for electric communications is used such that a single-core wire or a multicore wire is covered on its outer circumference directly with an armor or in a loose state. In another case, a protecting tube for an armor to cover the communication wire is laid in advance in the cable shape, and the communication wire may later be inserted, if necessary, into the protecting tube.

The communication wire may be deteriorated in the transmission characteristics by a bend or side pressure. It is, therefore, necessary to prevent the communication wire from being excessively bent. As the communication cable 10 using the optical fiber for preventing the transmission loss due to the bend, there has been known in the related art the construction which is provided with annular corrugations on the armor as referred to in patent publication JP-A-11-223752.

FIG. 18 is a diagram showing the communication cable which is provided with a bend preventing coating, as disclosed in JP-A-11-223752. In FIG. 18: reference numeral 1 designates an optical fiber; numeral 2 a sheath; and numeral 3 a bend preventing coating. The optical fiber 1 is formed of the optical fiber (as usually called the "plastic fiber"), in which a core portion made of an acrylic resin or polycarbonate resin is enclosed with a similar resin having a lower refractive index than that of the core portion.

This optical fiber 1 is covered on its outer circumference with the sheath 2 of an extensible polyethylene resin or vinyl chloride resin, which is covered on its outer side with the bend preventing coating 3 made of a resin like that of the sheath 2. The bend preventing coating 3 is corrugated by forming a number of annular slits along the circumference of its surface. The communication cable thus constructed can be prevented from being bent to a predetermined or larger angle, because the adjoining convex portions of the bend preventing coating 3 come into contact with each other when the communication cable is bent.

However, the bend preventing coating 3 thus far described has such a structure that the corrugations are formed in the coating portion made of the identical extensible polyethylene resin, vinyl chloride resin or the like.

Therefore, a little difference is made in the force required for the bend before and after the contact of the adjoining convex portions. When the communication cable is bent, therefore, there is a danger that the bend is proceeded over the predetermined or smaller diameter by an inertia or the like. When the adjoining convex portions contact, moreover, the coating is deformed so that a sufficient bend preventing effect cannot be attained. If the corrugated bend preventing coating 3 is made of a hard resin so as to reduce the deformation of the convex portions, therefore, the convex portions are whitened when the communication cable is repeatedly bent, so that they are disadvantageously cracked.

The present invention has been conceived in view of the background thus far described and has an object to provide a communication cable and a communication wire protecting tube, which can be easily bent to a predetermined bend radius by a low force but which requires such a higher force for the bend of a smaller diameter that it may be hard to bend.

SUMMARY OF THE INVENTION

According to the invention, there is provided a communication cable comprising: a communication wire; and an armor including at least two synthetic resin layers and protecting the communication wire in a loose state. The most hard resin layer of the armor has a crosswise or spiral annular groove continuous in the longitudinal direction to reach the radially inner face. The outermost layer of the armor is formed of a protective layer made of a softer resin than the hard resin layer. The adjoining edge portions of the annular groove come, when the communication wire is to be bent, into contact with each other so that it may be prevented from being bent to a predetermined or smaller bend radius.

According to the invention, there is also provided a communication wire protecting tube comprising at least two synthetic resin layers and inserting a communication wire in a loose state. The most hard resin layer of the protecting tube has a crosswise or spiral annular groove continuous in the longitudinal direction to reach the radially inner face. The outermost layer of the protecting tube is formed of a protective layer made of a softer resin than the hard resin layer. The adjoining edge portions of the annular groove come, when the protecting tube is to be bent, into contact with each other so that it may be prevented from being bent to a predetermined or smaller bend radius.

According to the invention, moreover, there is provided a communication wire protecting tube comprising coating layers made of synthetic resins, wherein a spiral or circumferential cut is so formed in at least one of the coating layers as to extend throughout the one coating layer.

According to the invention, moreover, there is provided a process for manufacturing a communication wire protecting tube having a coating layer made of a synthetic resin, comprising: extruding a tube of a synthetic resin by an extrusion shaping method; and cutting the tube spirally or circumferentially therethrough.

According to the invention, moreover, there is provided a process for manufacturing a communication cable protecting tube having a coating layer made of a synthetic resin, comprising: extruding a tube of a synthetic resin by an extrusion shaping method; and cutting the tube spirally or circumferentially therethrough.

EFFECTS OF THE INVENTION

According to the invention, as apparent from the description thus far made, the force required for the bend can be made different by two or more times before and after the edge portions, as adjoining across the annular groove or the cut portion, of the hard resin layer contact with each other. Therefore, the bend can be done by a low force up to a predetermined bend radius but can be made hard for any further bend because it requires a high force. By arranging the tensile strength fibers on the outer face of the hard resin layer, moreover, it is possible to prevent the bend of the predetermined or smaller radius.

BRIEF DESCRIPTION OF DRAWINGS

[FIG. 13]
Diagrams for explaining a manufacturing example of a further embodiment of the invention.

EXPLANATION OF NUMBER 10,10A - - - COMMUNICATION CABLE
10',10'A - - - COMMUNICATION WIRE PROTECTING TUBE
11,11A,11B,11C - - - OPTICAL FIBER CORE
12,12A - - - TENSILE STRENGTH FIBERS
13,13A,13B,13C - - - armor
13AA - - - HARD TUBE
13a,13aA,13aB,13aC - - - HARD RESIN LAYER
13b,13bA,13bB,13bC - - - PROTECTIVE LAYER
13c,13cA - - - SOFT RESIN LAYER
14 - - - ANNULAR GROOVE
14A,14B,14C - - - CUT PORTION
14a,14aA - - - EDGE PORTION
15,15A - - - CONTACT PORTION
16,16A - - - TENSILE STRENGTH FIBERS
17,17A - - - GROOVES
17',17'A - - - SMALL PROJECTIONS
18 - - - FEED REEL
19,19' - - - CROSS HEAD
20,20' - - - RESIN TANK
21 - - - ANNULAR GROOVE FORMING UNIT
22 - - - CAPSTAN
23 - - - TAKE-UP REEL
24 - - - TURNING JIG
24a - - - GROOVING PROJECTION
100 - - - COMMUNICATION CABLE
101 - - - HIGH-TENSION ELEMENTS
200 - - - MANUFACTURING PROCESS
201 - - - BOBBIN
202 - - - FIBER CORE BOBBIN
203 - - - EXTRUDING MACHINE
204 - - - FIRST WATER TANK
205 - - - SECOND WATER TANK
206 - - - MEASURING INSTRUMENT
207 - - - CAPSTAN
208 - - - CUTTING MACHINE
208A - - - CUTTER
208B - - - PRESSER ROLLERS
209 - - - THIRD WATER TANK
210 - - - WHEEL CAPSTAN
211 - - - DANCER ROLLER
212 - - - TAKE-UP BOBBIN
300 - - - COMMUNICATION CABLE
400 - - - COMMUNICATION CABLE

DETAILED DESCRIPTION OF THE INVENTION

Figure 1:
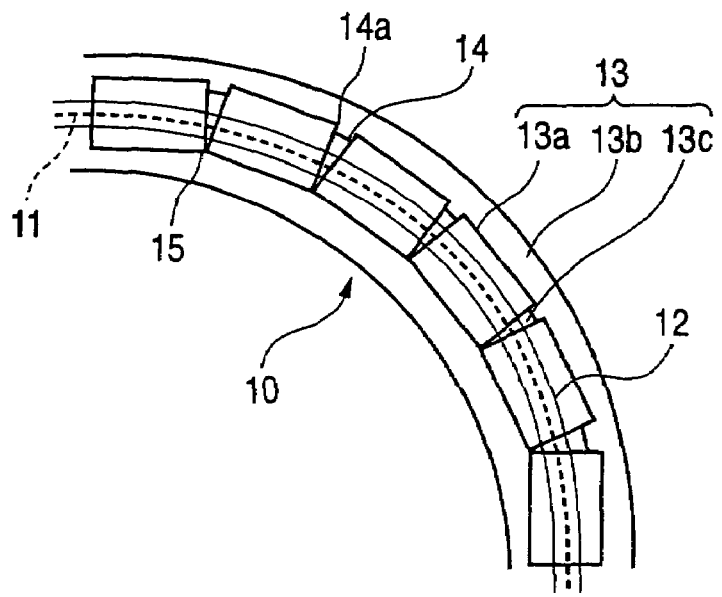
[FIG. 1]
A schematic diagram for explaining for explaining the invention.
Figure 2:
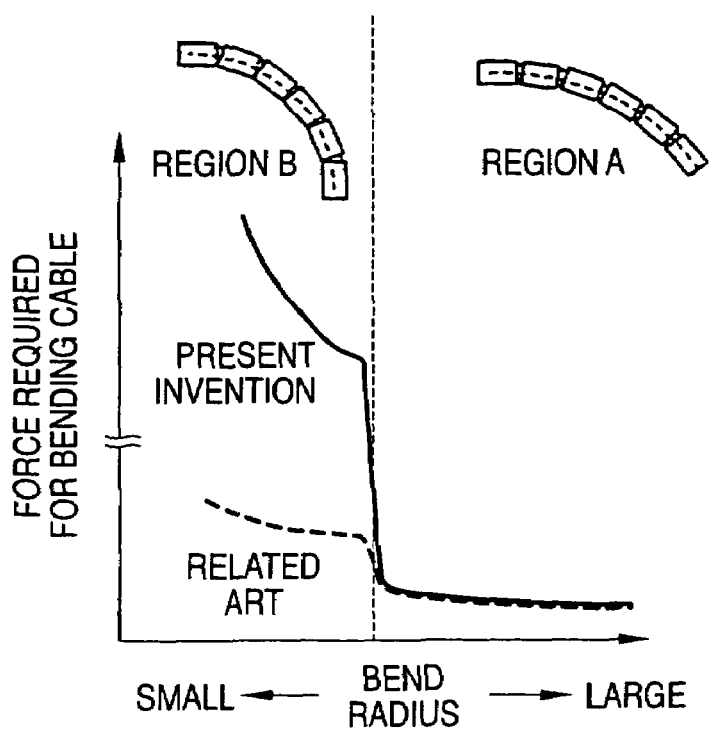
[FIG. 2]
A diagram for explaining the actions of the invention.

The present invention will be schematically described with reference to FIG. 1 and FIG. 2. FIG. 1 is a schematic diagram for explaining the invention, and FIG. 2 is a diagram for explaining the actions of the invention. In the Drawings: reference numeral 10 designates a communication cable; numeral 11 an optical fiber core; numeral 12 tensile strength fibers; numeral 13 an armor; numeral 13a a hard resin layer; numeral 13b a protective layer; numeral 13c a soft resin layer; numeral 14 an annular groove; numeral 14a an edge portion; and numeral 15 a contact portion.

In case the communication wire is an optical fiber, the communication cable 10 of the invention is concerned with the mode, in which the optical fiber core 11 is sheathed in a loose state with the armor 13 through or not through the tensile strength fibers 12. In case the communication wire is a conductor, on the other hand, a pair-twisted or C-twisted conductor is covered in a loose state with the armor 13 through or not through a shielded conductor.

The armor 13 of the signal wire (i.e., the optical fiber core 11) is formed by laminating two or more synthetic resin layers into a tubular shape. For example: the soft resin layer 13c made of a relatively soft thermoplastic resin is arranged as the innermost resin layer; the hard resin layer 13a made of a harder thermoplastic resin than the soft resin layer 13c and the protective layer 13b is arranged on the outer side of the soft resin layer 13c; and a thinner and softer resin layer than the hard resin layer 13a made of a thermoplastic resin is arranged as the protective layer 13b in the outermost layer. Moreover, the hard resin layer 13a is formed to have such crosswise or spiral annular grooves 14 continuously in the longitudinal direction as reaches the soft resin layer 13c in the circumferential direction (or as is cut in the radial direction). Here, the width, pitch and so on of the annular grooves 14 are suitably selected according to the allowable minimum bend radius of the communication wire.

When the communication cable 10 thus constructed is curved, as shown in FIG. 1, the annular grooves 14 are closed on the inner side of the curvature and opened on the outer side. As the curvature advances so that the bend radius becomes smaller, the edge portions 14a, as adjoining on the inner side of the curvature, of the hard resin layer 13a of the annular grooves 14 come into contact with each other so that the bend starts from the contact portions 15 of the edge portions 14a.

In case the bend is further advances from the starting points of the contact portions 15 of the hard resin layer 13a, these contact portions 15 are subject to a compression strain. However, the hard resin layer 13a per se is made a relatively hard thermoplastic resin so that it is hardly deformed by the compression strain. And, the protective layer 13b and the soft resin layer 13c are extended on the radially outer side of the curvature and compressed on the radially inner side so that they are hardly bent.

FIG. 2 is a diagram for explaining the actions thus far described and illustrates relations between the bend radium of the communication cable 10 and the force required for the bend. In FIG. 2, a region A is in a state where the bend radius is relatively large so that the edge portions 14a of the hard resin layer 13a are out of contact, and a region B is in a state where bent radius is relatively small so that the edge portions 14a of the hard resin layer 13a are in contact. The soft resin layer 13c on the inner side is exposed to the outside at the bottom portions of the annular grooves 14 and is made of a relatively soft resin material having a small modulus of elasticity, so that it can be bent in the region A within the range of a flexural rigidity by a relatively low force. In the region B, however, the protective layer 13b and the soft resin layer 13c are subject to a tensile stress so that the force required for the bend abruptly rises.

Figure 18:
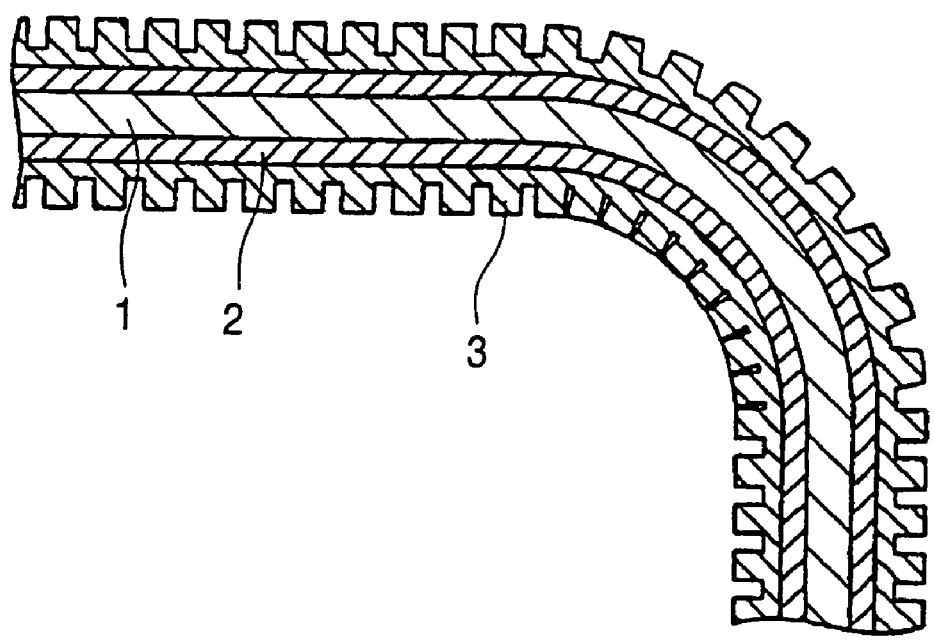
[FIG. 18]
A diagram for explaining the related art.

In the related art disclosed in JP-A-11-223752, as shown in FIG. 18, a bend preventing coating has a number of annular slits formed along the circumference of its surface thereby to have a corrugated shape. Therefore, the construction of the related art also has the region A and the region B, of which the region B makes a little bit large the force required for the bend. However, the concave portions (corresponding to the annular grooves of the invention) are formed just up to midway of the extensible bend preventing coating made of a single region. Even with contacts between the convex portions, therefore, the force required for the bend has such little difference before and after the contacts that the state change from the region A to the region B is not prominent. Thus, the bend preventing coating is bent up to the bend radius belonging to the region B.

In the case of the invention, on the contrary, the annular grooves 14 are so radially cut in the internal radius face of the hard resin layer 13a as to reach the soft resin layer 13c. Therefore, the difference in the force required for the bend between the region A and the region B, so that the instant to reach the state of the region B can be easily sensed as the bend radius is made smaller. As a result, it is possible to prevent the communication cable 10 reliably from being bent to a predetermined or smaller bend radius.

With reference to FIG. 1 and FIG. 2, the invention has been described on the embodiment, in which the soft resin layer 13c is positioned on the inner side of the hard resin layer 13a. However, the communication cable 10 can also be prevented by similar actions from being bent to the predetermined or smaller bend radius, in case the soft resin layer 13c is absent from the inner side of the hard resin layer 13a, that is, in case the hard resin layer 13a is the innermost layer of the armor 13. Moreover, the optical fiber core 11 can move loosely and freely with respect to the armor 13. Therefore, the tensile force is hardly influenced by the bend so that the transmission loss can be reduced.

Figure 3A:
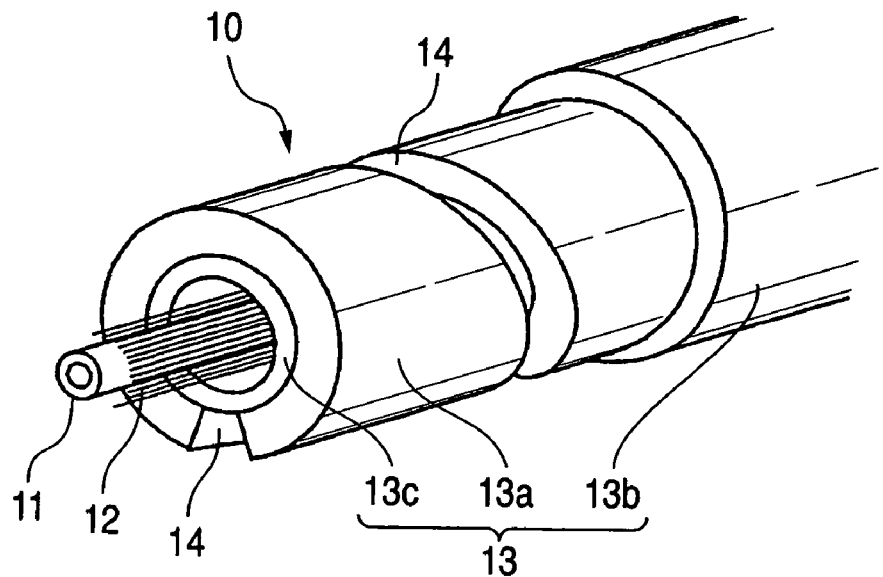
[FIG. 3]
Diagrams for explaining embodiments of the communication cable according to the invention.
Figure 3B:
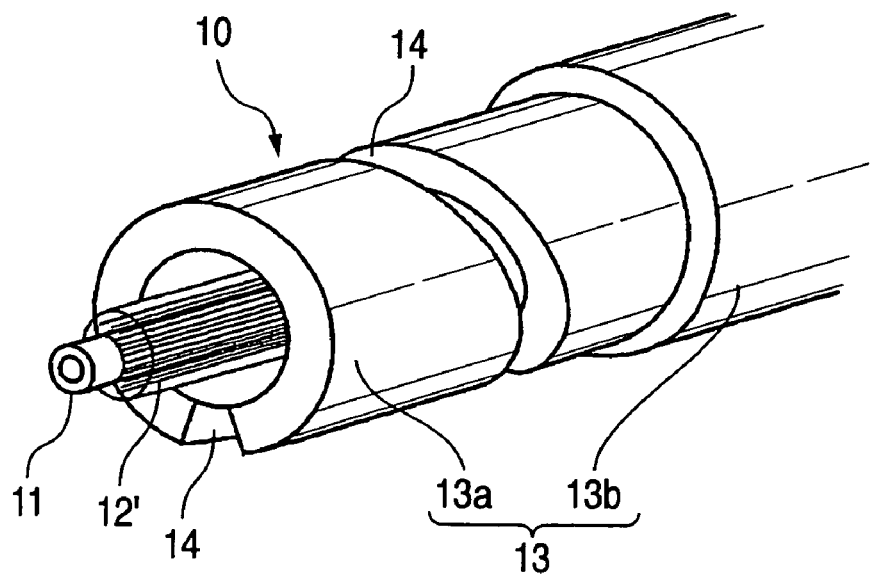
Figure 4A:
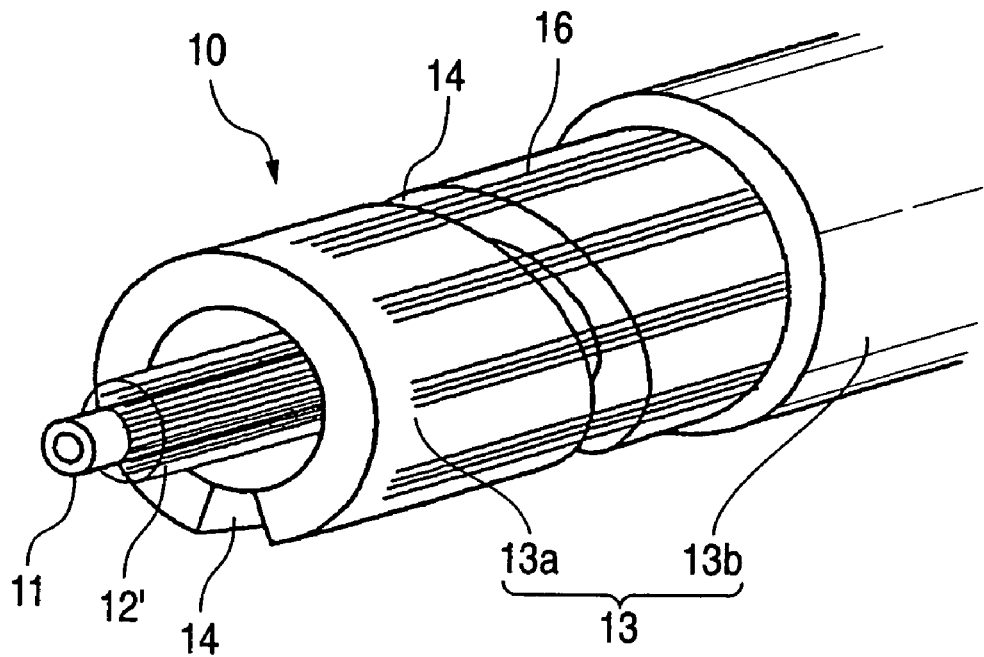
[FIG. 4]
Diagrams for explaining other embodiments of the communication cable according to the invention.
Figure 4B:
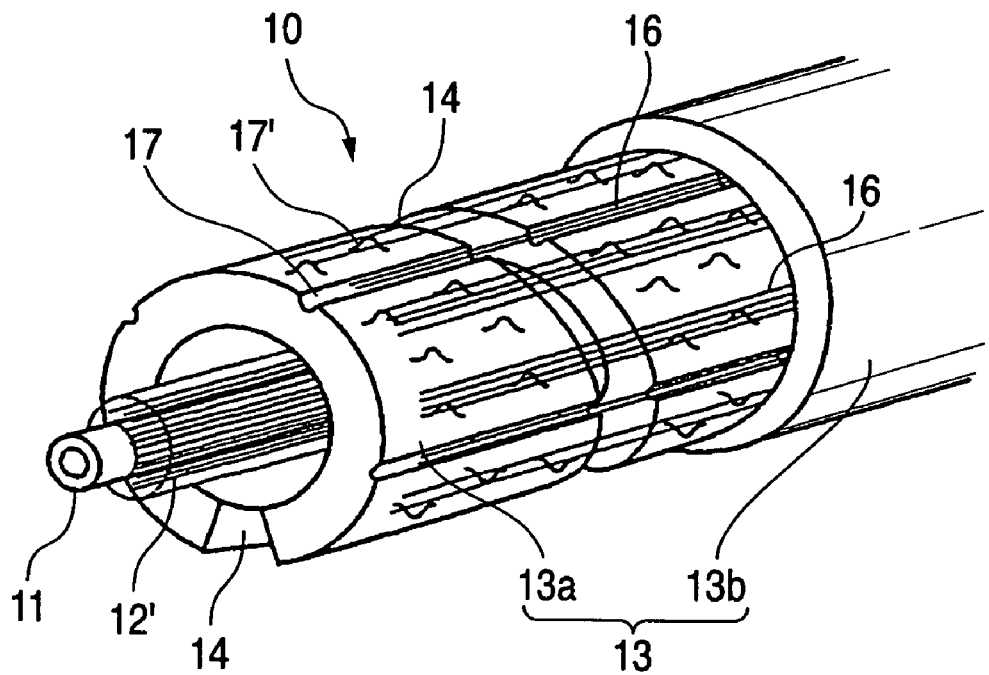

FIG. 3 and FIG. 4 are diagrams for explaining modes of embodiment of the invention by using an optical fiber as the communication wire. FIG. 3(A) is a diagram showing an embodiment, in which the soft resin layer is positioned on the inner side of the hard resin layer; FIG. 3(B) is a diagram showing an embodiment, in which the soft resin layer is not positioned on the inner side of the hard resin layer; FIG. 4(A) is a diagram showing an embodiment, in which tensile strength fibers are arranged between the hard resin layer and the protective layer; and FIG. 4(B) is a diagram showing an embodiment, in which the hard resin layer is corrugated on its outer face to prevent the displacement of the tensile strength fibers. In these Figures: numeral 16 designates the tensile strength fibers; numeral 17 a groove; numeral 17' small projections; and the remaining numerals designate the same components as those used in FIG. 1 so that their description is omitted.

The optical fiber core 11 used as the communication wire is formed by coating a glass fiber including a core portion and a clad portion, with one or two layers of an ultraviolet curing resin. Here, the optical fiber core 11 may also be called the "optical fiber wire", in case it is not colored. In the invention, the optical fiber core 11 will be used to have a meaning covering the optical fiber wire. For example, the optical fiber core 11 used is prepared by coating a glass fiber having a nominal external diameter of 0.125 mm with an ultraviolet curing resin having an external diameter of 0.24 mm to 0.26 mm.

The communication cable 10 is prepared by covering the outer circumference of the optical fiber core 11 with the armor 13 and is employed not only as a wire in a vehicle or a communication device but also as a drop cable or an indoor cable. The armor 13 in the invention is formed of a two-layered structure including at least the hard resin layer 13a and the protective layer 13b. The hard resin layer 13a is made of a harder thermoplastic resin than the protective layer 13b and the soft resin layer 13c and is preferred to have a Rockwell surface hardness of R100 after formed.

The proper material for the hard resin layer 13a is exemplified by Nylon 12, Nylon 6, a polycarbonate resin, a polypropylene resin, a polyterephthalate resin, an ABS resin or the like. Moreover, it is desired that the linear expansion coefficient of the hard resin layer 13a is reduced to have a smaller difference from the linear expansion coefficient of the optical fiber by adding to those resin 30 wt. % of a filler of glass fibers, carbon fibers, inorganic powder, metal powder or the like. By reducing the different from the linear expansion coefficient of the optical fiber, it is possible to prevent the linear length difference from a rising between the armor 13 and the optical fiber especially for the use at a low temperature, thereby to prevent the transmission loss from increasing.

The protective layer 13b covers the annular groove 14 of the hard resin layer 13a to give it a cushioning function for damping the shocks and to prevent a foreign substance from entering the annular groove 14. Moreover, the protective layer 13b can improve the cable appearance thereby to lighten the unshapeliness even in case the wire is exposed indoors. In case the hard resin layer 13a is provided with the tensile strength fibers 16 on its outer face, moreover, the protective layer 13b can be given a function to hold and prevent the tensile strength fibers 16 from going out of position.

The protective layer 13b is made of a softer and more extensible thermoplastic resin than the hard resin layer 13a. At the bent portion, therefore, an easy extension occurs on the radially outer side of the bend, but a slackness occurs on the radially inner side, so that the bending characteristics are not obstructed, as has been described with reference to FIG. 2. A proper resin material for the protective layer 13b is exemplified by polyethylene, polyvinyl chloride, an elastomer of polyolefin, polyurethane or the like.

In the case of the invention, in which the cable is provided with the soft resin layer 13c on the inner side of the hard resin layer 13a, the soft resin layer 13c can also be made of a soft resin material like that of the protective layer 13b. In this case, moreover, it is desired that the soft resin layer 13c on the inner side has an elastic modulus of 50 MPa to 1,000 MPa whereas the hard resin layer 13a on the outer side has an elastic modulus of 2,500 MPa to 10,000 MPa.

FIG. 3(A) is a diagram showing an embodiment of the cable of the mode, in which the cable is provided with the soft resin layer 13c on the inner side of the hard resin layer 13a. In this case, the soft resin layer 13c is shaped by drawing it down onto the outer circumference of the optical fiber core 11 through or not through the tensile strength fibers 12, so that it is formed into a tubular shape while being in a loose state out of contact with the optical fiber core 11. The hard resin layer 13a is protruded to contact with the outer circumference of that soft resin layer 13c. The spiral annular groove 14 can be formed in the hard resin layer 13a with a shaping die at the extruding time, or the annular groove 14 can be formed by grooving the hard resin layer 13a when the resin is fully cured or partially cured.

The annular groove 14 of the hard resin layer 13a is so formed continuously in the longitudinal direction as reaches the surface of the soft resin layer 13c on the inner side (or as are cut in the radial direction). Here in the construction having the soft resin layer 13c on the inner side, the annular groove 14 can be formed by cutting the hard resin layer 13a crosswise on the base of the soft resin layer 13c. The protective layer 13b is formed by extruding it in contact with the outer circumference of the hard resin layer 13a having the annular groove 14 formed therein. Here in case the resin material of the protective layer 13b has a low viscosity, the protective layer 13b can also be formed by drawing it down.

FIG. 3(B) is a diagram showing an embodiment of the cable of the mode, in which the cable is not provided with the soft resin layer 13c on the inner side of the hard resin layer 13a. In this case, the hard resin layer 13a is shaped by drawing it down onto the outer circumference of the optical fiber core 11 through or not through tensile strength fibers 12', so that it is formed into a tubular shape while being in a loose state out of contact with the optical fiber core 11. The spiral annular groove 14 can be formed in the hard resin layer 13a when the resin is fully cured or partially cured. Here, the tensile strength fibers 12' to be fitted on the outer circumference of the optical fiber core 11 can be buried in the soft resin.

The annular groove 14 of the hard resin layer 13a is formed continuously in the longitudinal direction with a depth to reach the radially inner face. Here in this construction of FIG. 3(B) not provided with the soft resin layer 13c, the annular groove 14 cannot be crosswise cut so that it becomes spiral. As in the case of FIG. 3(A), the protective layer 13b is formed in such a mode that it closely contacts with the outer circumference of the hard resin layer 13a having the annular groove 14 formed therein.

FIG. 4(A) is a diagram showing an embodiment, in which the tensile strength fibers 16 are arranged between the hard resin layer 13a and the protective layer 13b. A bend of a predetermined or less radius can be detected and suppressed from any further bend by the hard resin layer 13a, but the more excessive bend could be done if intended so. As shown in FIG. 4(A), however, the bend of the optical fiber core 11 of the predetermined or smaller radius can be prevented by arranging the tensile strength fibers 16 on the outer face of the hard resin layer 13a.

The tensile strength fibers 16 to be used can be exemplified by aramid fibers, carbon fibers, glass fibers or the like. It is desired that the diameter of each of those fibers is set at such a value of several microns to several tens microns that the fibers positioned on the radially inner side of the bend may be bent but not cut when the cable is bent. The tensile strength fibers 16 may be arranged along the longitudinal direction of the hard resin layer 13a, as shown in FIG. 4(A), but could also be arranged by winding them in the opposite direction of the spiral direction of the annular groove 14. The allowable bend range can be adjusted by adjusting the winding pitch. Moreover, the tensile strength fibers 16 may also be arranged by braiding them in the longitudinal direction of the hard resin layer 13a.

FIG. 4(B) shows an embodiment, in which the axial grooves 17 or the small projections 17' are formed in the outer face of the hard resin layer 13a. The tensile strength fibers 16 can be prevented from going out of position by forming the protective layer 13b in contact. If the tensile strength fibers 16 are curved, however, they may be more or less displaced to lower the bend preventing effect. By corrugating the outer face of the hard resin layer 13a, as shown in FIG. 4(B), the tensile strength fibers 16 can be prevented from going out of position so that they can prevent the bend of the predetermined or smaller radius effectively. Here, FIG. 4(A) and FIG. 4(B) show the embodiments, in which the cable is not provided with the soft resin layer on the inner side of the hard resin layer 13a. However, the invention can also be likewise applied to the shape having the soft resin layer.

Figure 5A:
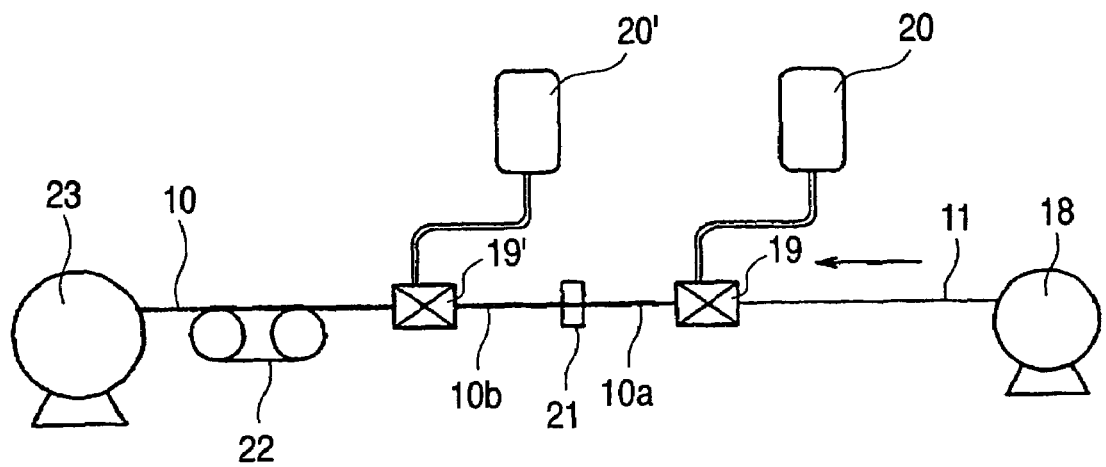
[FIG. 5]
Diagrams for explaining an embodiment of the manufacture of the invention.
Figure 5B:
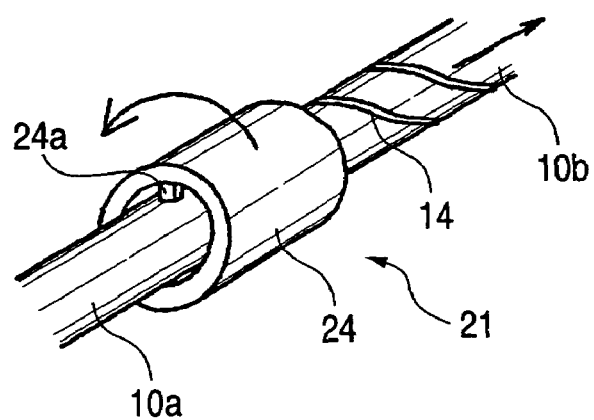

Of FIG. 5 presenting diagrams showing one embodiment of the manufacture of the communication (or optical fiber) cable thus far described, FIG. 5(A) is a schematic diagram of the entirety, and FIG. 5(B) is a diagram showing one working example of the annular groove. In these Figures: numeral 10 designates the communication cable after the protective layer was formed; numeral 10a a cable just after the hard resin layer was formed; numeral 10b a cable after grooved; numeral 11 the optical fiber core; numeral 18 a feed reel; numerals 19 and 19' cross heads; numerals 20 and 20' resin tanks; numeral 21 an annular groove forming unit; numeral 22 a capstan; numeral 23 a take-up reel; numeral 24 a turning jig; and numeral 24a a grooving projection.

In FIG. 5(A), the optical fiber core 11 is let off the feed reel 18, and the soft resin layer and the hard resin layer are formed by the first cross head 19. This first cross head 19 is fed with the thermoplastic resin for the soft resin layer and the thermoplastic resin for the hard resin layer individually from the resin tank 20. Here, FIG. 5(A) shows an embodiment, in which the soft resin layer and the hard resin layer are formed by the single cross head 19. However, the soft resin layer and the hard resin layer may also be formed by separate cross heads. In the case of no soft resin layer, moreover, it is natural to form only the hard resin layer.

The annular groove 14is formed by the annular groove forming unit 21 in the hard resin layer of the cable 10a after the hard resin layer was formed by the first cross head 19. The protective layer is formed by the second cross head 19' in the outer side of the cable 10b having the annular groove 14 formed therein. The second cross head 19' is fed with a relatively soft thermoplastic resin from the resin tank 20'. Here in case the tensile strength fibers are to be arranged on the outer face of the hard resin layer, they are fed between the annular groove forming unit 21 and the second cross head 19' and are closely fixed along the outer face of the cable 10b by forming the protective layer. The communication cable 10 having the protective layer formed thereon is taken over by the capstan 22 and is taken up by the take-up reel 23.

The annular groove forming unit 21 can be constructed, for example, to have the cylindrical turning jig 24 having the grooving projection 24a on its inner side, as shown in FIG. 5(B). The turning jig 24 is arranged turnably on the cable 10a just after given the hard resin layer, to form the spiral annular groove 14 in the hard resin layer. This annular groove 14 is formed either such that the forming projection 24a pushes the hard resin layer in the fully or partially cured state from the outer circumference or such that the forming projection 24a scrapes a portion of the resin layer.

The invention has been described on the embodiment, in which the armor is formed in the loose state directly on the outer circumference of the optical fiber core. By forming only the armor before hand in a communication wire protecting tube, however, the optical fiber core could also be later inserted into the protecting tube. The construction of the communication wire protecting tube can be illustrated as a tubular member having the shape, as shown in FIG. 3 and FIG. 4, and excepting the optical fiber core.

Figure 6A:
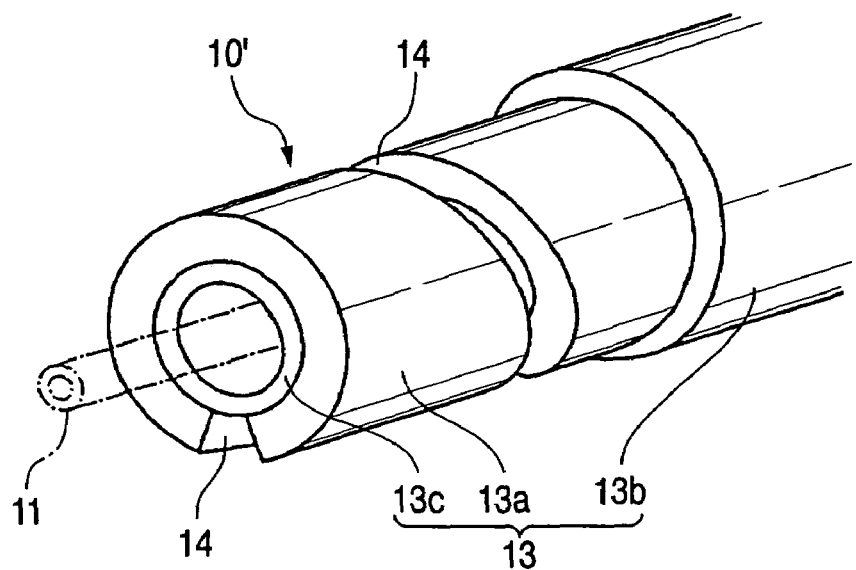
[FIG. 6]
Diagrams for explaining embodiments of the communication wire protecting tube according to the invention.
Figure 6B:
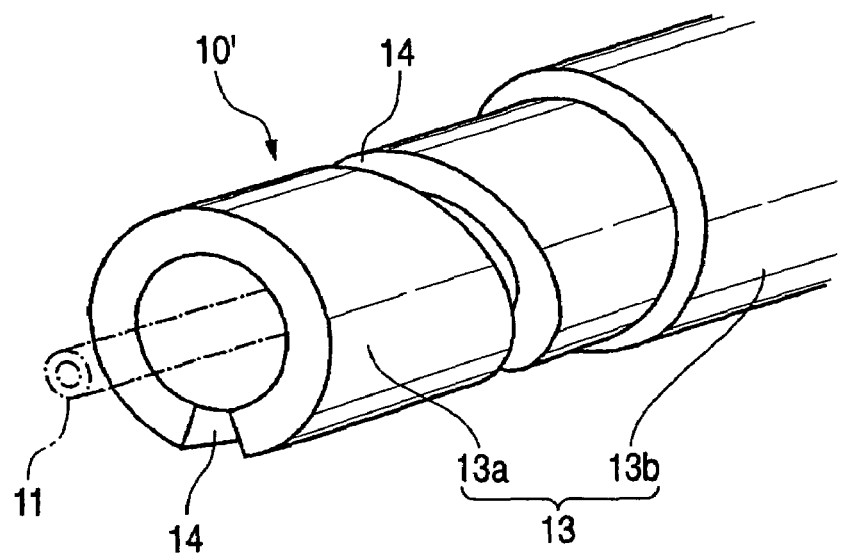
Figure 7A:
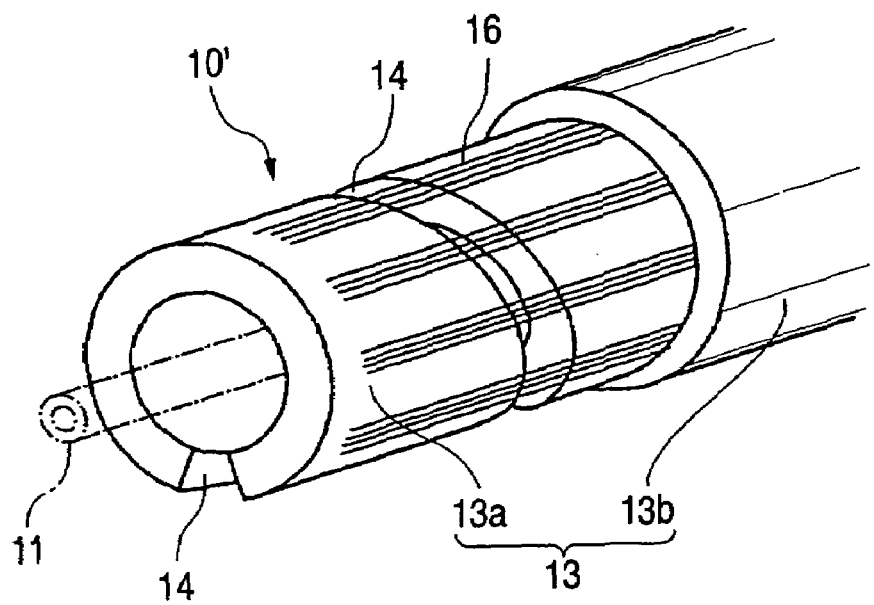
[FIG. 7]
Diagrams for explaining other embodiments of the communication wire protecting tube according to the invention.
Figure 7B:
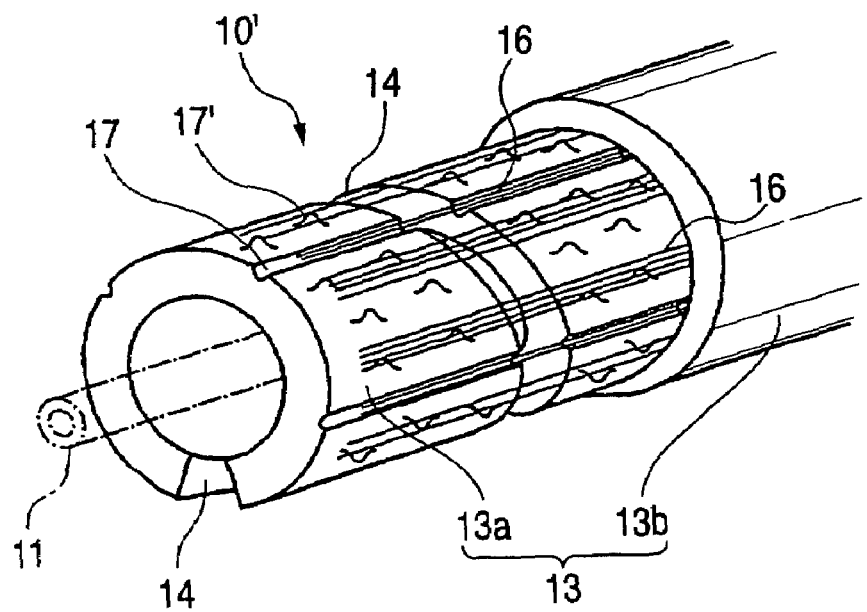

FIG. 6 and FIG. 7 are diagrams showing the communication cables described above. FIG. 6(A) is a diagram showing an embodiment having the soft resin layer on the inner side of the hard resin layer; FIG. 6(B) is a diagram showing an embodiment not having the soft resin layer on the inner side of the hard resin layer; FIG. 7(A) is a diagram showing an embodiment, in which the tensile strength fibers are arranged between the hard resin layer and the protective layer; and FIG. 7(B) is a diagram showing an embodiment for preventing the displacement of the tensile strength fibers by corrugating the outer face of the hard resin layer. The numerals in these Figures designate the same components as those used in FIG. 3 and FIG. 4 so that their description is omitted.

In the mode of the embodiment shown in FIG. 6(A), a communication wire protecting tube 10' has the soft resin layer 13c on the inner side of the hard resin layer 13a. In this case: the soft resin layer 13c is formed in a circular tube shape; the hard resin layer 13 a harder than the soft resin layer 13c is formed on the outer circumference of the latter; and the crosswise or spiral annular groove 14 is formed in the hard resin layer 13a. This annular groove 14 is formed continuously in the longitudinal direction with a depth to reach the soft resin layer 13c on the innerside. On the outer face of the hard resin layer 13a, moreover, there is formed the protective layer 13b, which is made of a softer resin than the hard resin layer 13a.

In the mode of the embodiment shown in FIG. 6(B), the communication wire protecting tube 10' has the soft resin layer 13c on the inner side of the hard resin layer 13a. In this case, the hard resin layer 13a is formed in a circular tube shape, and the spiral annular groove 14 is formed in the hard resin layer 13a. This annular groove 14 is formed continuously in the longitudinal direction with a depth to reach the radially inner face. On the outer face of the hard resin layer 13a, moreover, there is formed the protective layer 13b, which is made of a softer resin than the hard resin layer 13a.

In the mode of the embodiment of the communication wire protecting tube 10' shown in FIG. 7(A), the tensile strength fibers 16 are arranged between the hard resin layer 13a and the protective layer 13b. The tensile strength fibers 16 are disposed by various methods such as by arranging them along the longitudinal direction of the hard resin layer 13a or by winding or braiding them in the longitudinal direction.

In the mode of the embodiment of the communication wire protecting tube 10' shown in FIG. 7(B), the hard resin layer 13a has its outer face corrugated to suppress the displacement of the tensile strength fibers 16. Here in FIG. 7(A) and FIG. 7(B), the soft resin layer is not formed on the inner side of the hard resin layer 13a. However, this embodiment could also be applied to the shape having the soft resin layer.

The aforementioned communication wire protecting tubes 10' shown in FIG. 6 and FIG. 7 are enabled to prevent the bend by the constructions and actions similar to those of the embodiments of the communication cable described with reference to FIG. 1 to FIG. 4. Moreover, the communication wire protecting tubes 10' could also be used as the communication cable by laying them beforehand in the room or the like and by inserting the communication wire such as the optical fiber or the signal conductor into them. The insertion of the communication wire (e.g., the optical fiber core 11) into the communication wire protecting tubes 10' could be done by using the well-known various wiring methods.

Figure 8:
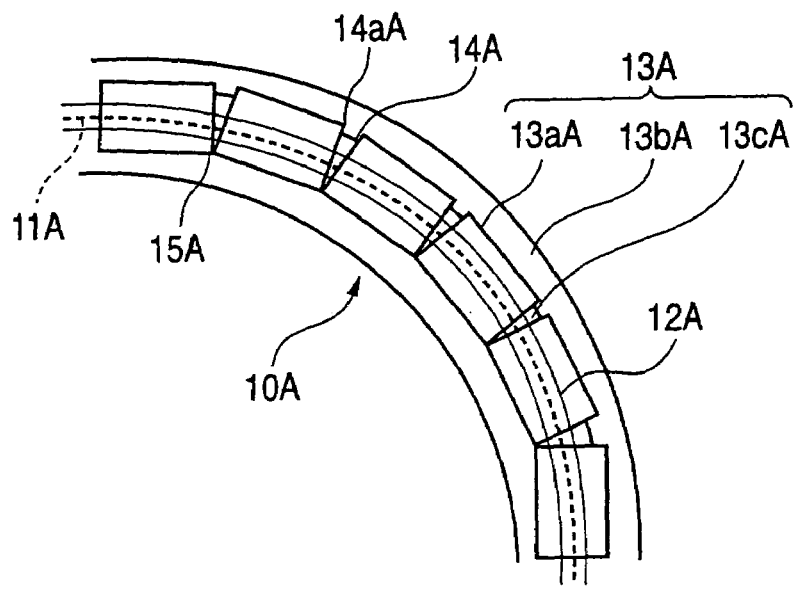
[FIG. 8]
A schematic diagram for explaining another embodiment of the invention.
Figure 9:
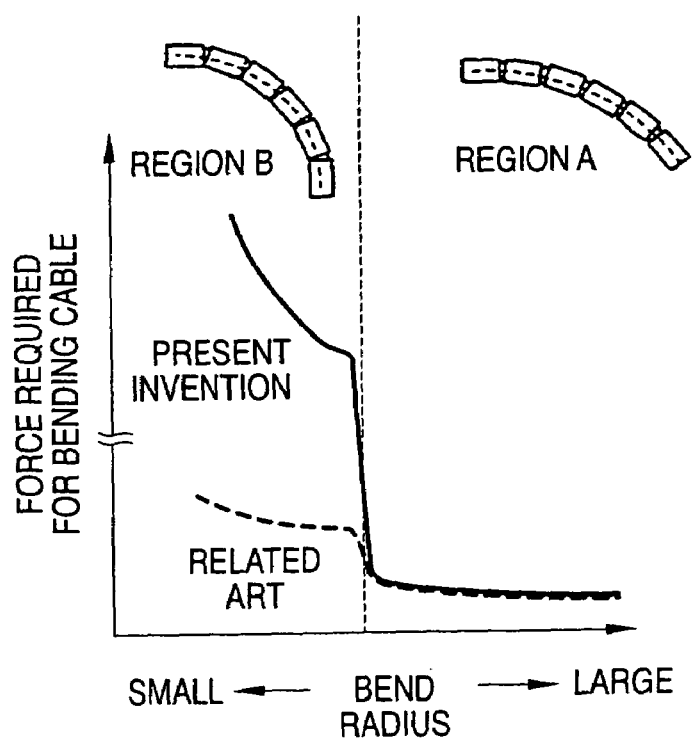
[FIG. 9]
A diagram for explaining the actions of the embodiment.

Here will be described another embodiment of the communication cable and the communication wire protecting tube according to the invention. FIG. 8 is a schematic diagram for explaining another embodiment of the communication cable, and FIG. 9 is a diagram for explaining the actions of the embodiment of the communication cable.

In the Drawings: reference numeral 10A designates a communication cable; numeral 11A an optical fiber core; numeral 12A tensile strength fibers; numeral 13A an armor (coating layer); numeral 13aA a hard resin layer; numeral 13bA a protective layer; numeral 13cA a soft resin layer; numeral 14A a cut portion; numeral 14aA an edge portion of the cut portion; and numeral 15A a contact portion.

In case the communication wire is an optical fiber, the communication cable 10A of the invention is concerned with the mode, in which the optical fiber core 11A is sheathed in a loose state with the armor 13A through or not through the tensile strength fibers 12A. In case the communication wire is a conductor, on the other hand, a pair-twisted or C-twisted conductor is covered in a loose state with the armor 13A through or not through a shielded conductor.

The armor 13A of the signal wire (i.e., the optical fiber core 1A) is formed by laminating one or a plurality of synthetic resin layers into a tubular shape. For example: the soft resin layer 13cA made of a relatively soft thermoplastic resin is arranged as the innermost resin layer; the hard resin layer 13aA made of a harder thermoplastic resin than the soft resin layer 13cA and the protective layer 13bA is arranged on the outer side of the soft resin layer 13cA; and a thinner and softer resin layer than the hard resin layer 13aA made of a thermoplastic resin is arranged as the protective layer 13bA in the outermost layer. Moreover, the hard resin layer 13aA is formed to have such circumferential or spiral cut portions 14A continuously in the longitudinal direction as reaches the soft resin layer 13cA in the circumferential direction (or as is cut in the radial direction). Here, the cut portion 14A can be made wide by extending itself in the longitudinal direction or widened while being cut, and this width is suitably selected according to the allowable minimum bend radius of the communication wire.

When the communication cable 10A thus constructed is curved, as shown in FIG. 8, the cut portions 14A are closed on the inner side of the curvature and opened on the outer side. As the curvature advances so that the bend radius becomes smaller, the edge portions 14aA, as adjoining on the inner side of the curvature, of the hard resin layer 13aA of the cut portions 14A come into contact with each other so that the bend starts from the contact portions 15A of the edge portions 14aA.

In case the bend is further advances from the starting points of the contact portions 15A of the hard resin layer 13aA, these contact portions 15A are subject to a compression strain. However, the hard resin layer 13aA per se is made a relatively hard thermoplastic resin so that it is hardly deformed by the compression strain. And, the protective layer 13bA and the soft resin layer 13cA are extended on the radially outer side of the curvature and compressed on the radially inner side so that they are hardly bent.

FIG. 9 is a diagram for explaining the actions thus far described and illustrates relations between the bend radium of the communication cable 10A and the force required for the bend. In FIG. 9, a region A is in a state where the bend radius is relatively large so that the edge portions 14aA of the hard resin layer 13aA are out of contact, and a region B is in a state where bent radius is relatively small so that the edge portions 14aA of the hard resin layer 13aA are in contact. The soft resin layer 13cA on the inner side is exposed to the outside at the bottom portions of the cut portions 14A and is made of a relatively soft resin material having a small modulus of elasticity, so that it can be bent in the region A within the range of a flexural rigidity by a relatively low force. In the region B, however, the protective layer 13bA and the soft resin layer 13cA are subject to a tensile stress so that the force required for the bend abruptly rises.

In the related art disclosed in JP-A-11-223752, as shown in FIG. 18, a bend preventing coating has a number of annular slits formed along the circumference of its surface thereby to have a corrugated shape. Therefore, the construction of the related art also has the region A and the region B, of which the region B makes a little bit large the force required for the bend. However, the concave portions are formed just up to midway of the extensible bend preventing coating made of a single region. Even with contacts between the convex portions, therefore, the force required for the bend has such little difference before and after the contacts that the state change from the region A to the region B is not prominent. Thus, the bend preventing coating is bent up to the bend radius belonging to the region B.

In the case of the invention, on the contrary, the cut portions 14A are so radially cut in the internal radius face of the hard resin layer 13aA as to reach the soft resin layer 13cA. Therefore, the difference in the force required for the bend between the region A and the region B, so that the instant to reach the state of the region B can be easily sensed as the bend radius is made smaller. As a result, it is possible to prevent the communication cable 10A reliably from being bent to a predetermined or smaller bend radius.

With reference to FIG. 8 and FIG. 9, the invention has been described on the embodiment, in which the soft resin layer 13cA is positioned on the inner side of the hard resin layer 13aA. However, the communication cable 10A can also be prevented by similar actions from being bent to the predetermined or smaller bend radius, in case the soft resin layer 13cA is absent from the inner side of the hard resin layer 13aA, that is, in case the hard resin layer 13aA is the innermost layer of the armor 13A. Moreover, the optical fiber core 11A can move loosely and freely with respect to the armor 13A. Therefore, the tensile force is hardly influenced by the bend so that the transmission loss can be reduced.

Figure 10A:
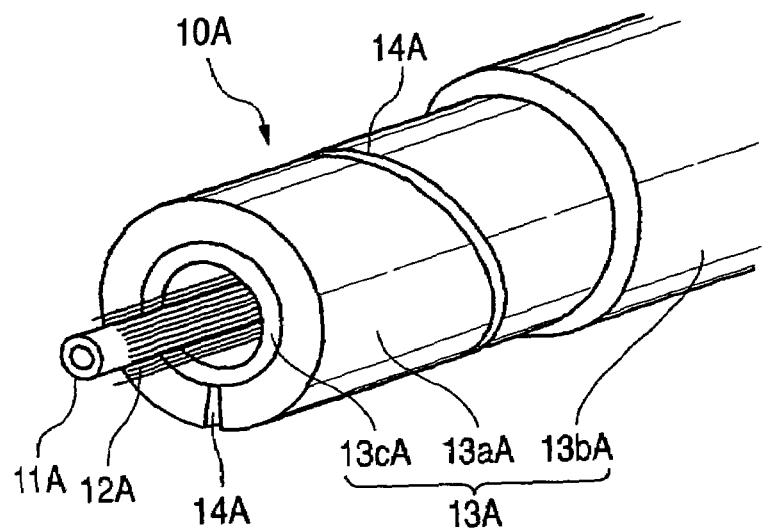
[FIG. 10]
Diagrams for explaining examples of the communication cable of still another embodiment of the invention.
Figure 10B:
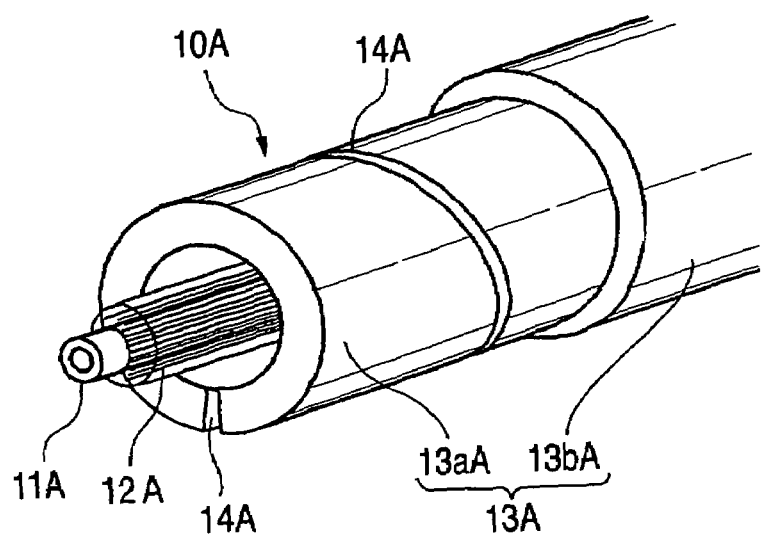
Figure 11A:
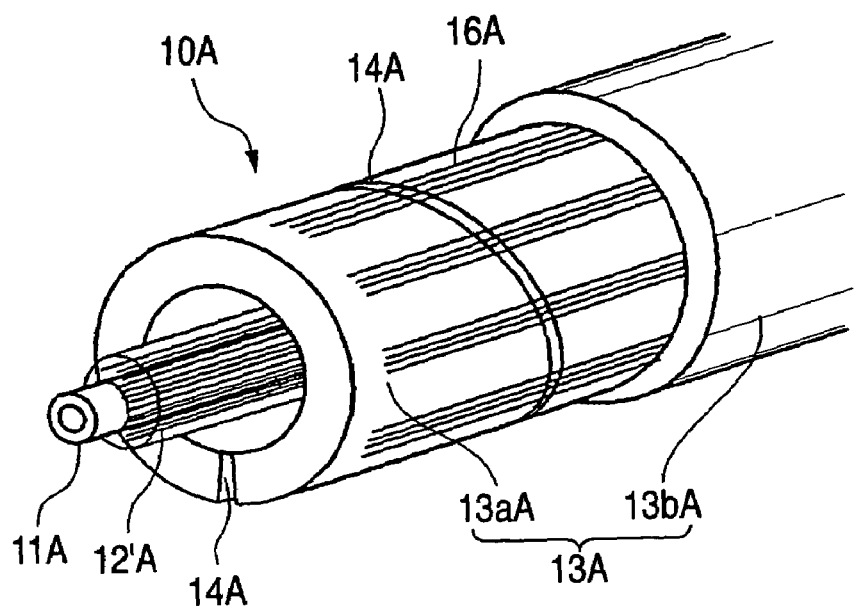
[FIG. 11]
Diagrams for explaining other examples of the communication cable of a further embodiment of the invention.
Figure 11B:
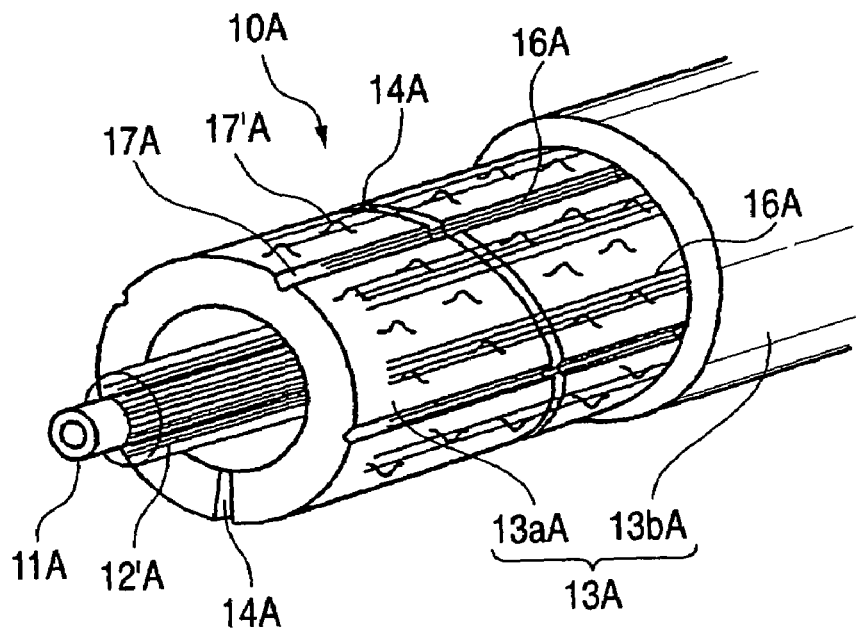

FIG. 10 and FIG. 11 are diagrams for explaining modes of another embodiment of the invention by using an optical fiber as the communication wire. FIG. 10(A) is a diagram showing an embodiment, in which the soft resin layer is positioned on the inner side of the hard resin layer; FIG. 10(B) is a diagram showing an embodiment, in which the soft resin layer is not positioned on the inner side of the hard resin layer; FIG. 11(A) is a diagram showing an embodiment, in which tensile strength fibers are arranged between the hard resin layer and the protective layer; and FIG. 11(B) is a diagram showing an embodiment, in which the hard resin layer is corrugated on its outer face to prevent the displacement of the tensile strength fibers. In these Figures: numeral 16A designates the tensile strength fibers; numeral 17A a groove; numeral 17'A small projections; and the remaining numerals designate the same components as those used in FIG. 8 so that their description is omitted.

The optical fiber core 11A used as the communication wire is formed by coating a glass fiber including a core portion and a clad portion, with one or two layers of an ultraviolet curing resin. Here, the optical fiber core 11A may also be called the "optical fiber wire ", in case it is not colored. In the invention, the optical fiber core 11A will be used to have a meaning covering the optical fiber wire. For example, the optical fiber core 11A used is prepared by coating a glass fiber having a nominal external diameter of 0.125 mm with an ultraviolet curing resin having an external diameter of 0.24 mm to 0.26 mm.

The communication cable 10A is prepared by covering the outer circumference of the optical fiber core 11A with the armor 13A and is employed not only as a wire in a vehicle or a communication device but also as a drop cable or an indoor cable. The armor 13A (coating layer) in the invention may be formed of a one-layered structure including the hard resin layer 13aA or at least two-layered structure including the hard resin layer 13aA and the protective layer 13bA. The hard resin layer 13aA is made of a harder thermoplastic resin than the protective layer 13bA and the soft resin layer 13cA and is preferred to have a Rockwell surface hardness of R100 after formed.

The proper material for the hard resin layer 13aA is exemplified by Nylon 12, Nylon 6, a polycarbonate resin, a polypropylene resin, a polyterephthalate resin, an ABS resin or the like. Moreover, it is desired that the linear expansion coefficient of the hard resin layer 13aA is reduced to have a smaller difference from the linear expansion coefficient of the optical fiber by adding to those resin 30 wt. % of a filler of glass fibers, carbon fibers, inorganic powder, metal powder or the like. By reducing the different from the linear expansion coefficient of the optical fiber, it is possible to prevent the linear length difference from arising between the armor 13A and the optical fiber especially for the use at a low temperature, thereby to prevent the transmission loss from increasing.

The protective layer 13bA covers the cut portion 14A of the hard resin layer 13aA to give it a cushioning function for damping the shocks and to prevent a foreign substance from entering the cut portion 14A. Moreover, the protective layer 13bA can improve the cable appearance thereby to lighten the unshapeliness even in case the wire is exposed indoors. In case the hard resin layer 13aA is provided with the tensile strength fibers 16A on its outer face, moreover, the protective layer 13bA can be given a function to hold and prevent the tensile strength fibers 16A from going out of position.

The protective layer 13bA is made of a softer and more extensible thermoplastic resin than the hard resin layer 13aA. At the bent portion, therefore, an easy extension occurs on the radially outer side of the bend, but a slackness occurs on the radially inner side, so that the bending characteristics are not obstructed, as has been described with reference to FIG. 9. A proper resin material for the protective layer 13bA is exemplified by polyethylene, polyvinyl chloride, an elastomer of polyolefin, polyurethane or the like.

In the case of the invention, in which the cable is provided with the soft resin layer 13cA on the inner side of the hard resin layer 13aA, the soft resin layer 13cA can also be made of a soft resin material like that of the protective layer 13bA. In this case, moreover, it is desired that the soft resin layer 13cA on the innerside has an elastic modulus of 50 MPa to 1,000 MPa where as the hard resin layer 13aA on the outer side has an elastic modulus of 2,500 MPa to 10,000 MPa.

FIG. 10(A) is a diagram showing an embodiment of the cable of the mode, in which the cable is provided with the soft resin layer 13cA on the inner side of the hard resin layer 13aA. In this case, the soft resin layer 13cA is shaped by drawing it down onto the outer circumference of the optical fiber core 11A through or not through the tensile strength fibers 12A, so that it is formed into a tubular shape while being in a loose state out of contact with the optical fiber core 11A. The hard resin layer 13aA is protruded to contact with the outer circumference of that soft resin layer 13cA. The spiral cut portion 14A can be formed in the hard resin layer 13aA with a shaping die at the extruding time, or the cut portion 14A can be formed by grooving the hard resin layer 13aA when the resin is fully cured or partially cured.

The cut portion 14A of the hard resin layer 13aA is so formed continuously in the longitudinal direction as reaches the surface of the soft resin layer 13cA on the inner side (or as are cut in the radial direction). Here in the construction having the soft resin layer 13cA on the inner side, the cut portion 14A can be formed by cutting the hard resin layer 13aA crosswise on the base of the soft resin layer 13cA. The protective layer 13bA is formed by extruding it in contact with the outer circumference of the hard resin layer 13aA having the cut portion 14A formed therein. Here in case the resin material of the protective layer 13bA has a low viscosity, the protective layer 13bA can also be formed by drawing it down.

FIG. 10(B) is a diagram showing an embodiment of the cable of the mode, in which the cable is not provided with the soft resin layer 13cA on the inner side of the hard resin layer 13aA. In this case, the hard resin layer 13aA is shaped by drawing it down onto the outer circumference of the optical fiber core 11A through or not through tensile strength fibers 12'A, so that it is formed into a tubular shape while being in a loose state out of contact with the optical fiber core 11A. The spiral cut portion 14A can be formed in the hard resin layer 13aA when the resin is fully cured or partially cured. Here, the tensile strength fibers 12'A to be fitted on the outer circumference of the optical fiber core 11A can be buried in the soft resin.

The cut portion 14A of the hard resin layer 13aA is formed continuously in the longitudinal direction with a depth to reach the radially inner face (penetrating). Here in this construction of FIG. 10(B) not provided with the soft resin layer 13cA, the cut portion 14A cannot be circumferential cut so that it becomes spiral. As in the case of FIG. 10(A), the protective layer 13bA is formed in such a mode that it closely contacts with the outer circumference of the hard resin layer 13aA having the cut portion 14A formed therein.

FIG. 11(A) is a diagram showing an embodiment, in which the tensile strength fibers 16A are arranged between the hard resin layer 13aA and the protective layer 13bA. A bend of a predetermined or less radius can be detected and suppressed from any further bend by the hard resin layer 13aA, but the more excessive bend could be done if intended so. As shown in FIG. 11(A), however, the bend of the optical fiber core 11A of the predetermined or smaller radius can be prevented by arranging the tensile strength fibers 16A on the outer face of the hard resin layer 13aA.

The tensile strength fibers 16A to be used can be exemplified by aramid fibers, carbon fibers, glass fibers or the like. It is desired that the diameter of each of those fibers is set at such a value of several microns to several tens microns that the fibers positioned on the radially inner side of the bend may be bent but not cut when the cable is bent. The tensile strength fibers 16A may be arranged along the longitudinal direction of the hard resin layer 13aA, as shown in FIG. 11(A), but could also be arranged by winding them in the opposite direction of the spiral direction of the cut portion 14A. The allowable bend range can be adjusted by adjusting the winding pitch. Moreover, the tensile strength fibers 16A may also be arranged by braiding them in the longitudinal direction of the hard resin layer 13aA.

FIG. 11(B) shows an embodiment, in which the axial grooves 17A or the small projections 17'A are formed in the outer face of the hard resin layer 13aA. The tensile strength fibers 16A can be prevented from going out of position by forming the protective layer 13bA in contact. If the tensile strength fibers 16A are curved, however, they may be more or less displaced to lower the bend preventing effect. By corrugating the outer face of the hard resin layer 13aA, as shown in FIG. 11(B), the tensile strength fibers 16A can be prevented from going out of position so that they can prevent the bend of the predetermined or smaller radius effectively. Here, FIG. 11(A) and FIG. 11(B) show the embodiments, in which the cable is not provided with the soft resin layer on the innerside of the hard resin layer 13aA. However, the invention can also be likewise applied to the shape having the soft resin layer.

Figure 12:
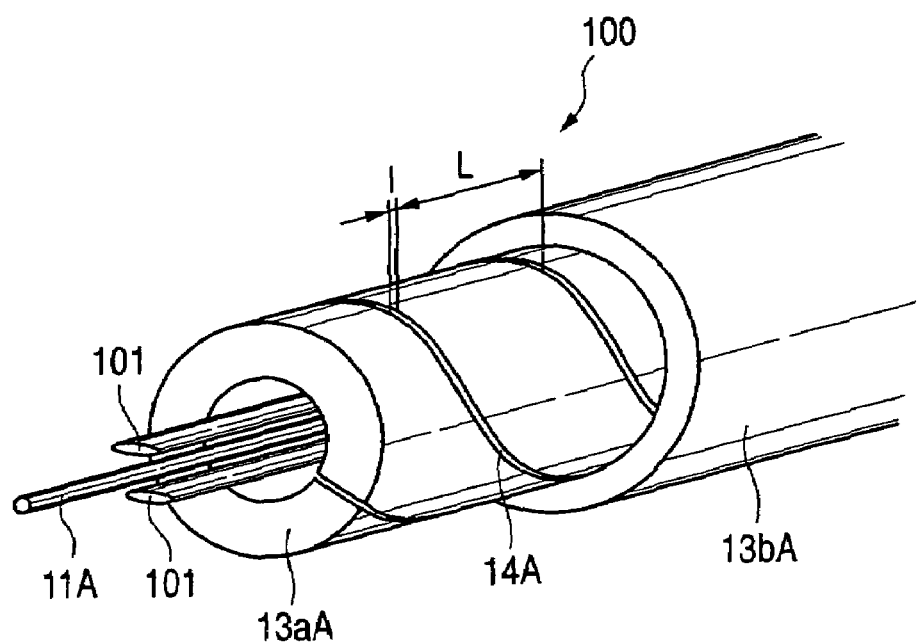
[FIG. 12]
A diagram for explaining another example of the communication cable of a further embodiment of the invention.

FIG. 12 shows another embodiment of the communication cable according to the invention and one example of a communication cable 100 having an optical fiber core 11A and high-tension elements 101 arranged in a hard resin layer 13aA or a coating layer. The high-tension elements 101 have an elliptical section, and the optical fiber core 11A is arranged in the minor axis direction between the high-tension elements 101 and 101. The material for the high-tension elements 101 can be exemplified by "VT" (i.e., the trade name of Kurare). If this material is used, the loose state can be kept without contact with the hard resin layer 13aA at the manufacturing time. The optical fiber core 11A and the high-tension elements 101 are covered with the hard resin layer 13aA, which has a spiral cut portion 14A formed therein. This cut portion 14A has no substantial width when the communication cable 100 is not bent. Alternatively, the cut width may be set beforehand according to the using conditions. It is desired that the width 1 of the cut portion 14A is 10% or less of the width L of the no-cut portion. When the width 1 of the cut portion 14A increases to exceed the aforementioned value of 10%, the cut width is reduced by the shrinkage of a protective layer 13bA at the manufacturing time of the communication cable or the shrinkage due to the use for a long time under a high-temperature condition. As a result, the high-tension elements 101 or the optical fiber core 11A may meander in the hard resin layer 13aA thereby to degrade the transmission characteristics of the communications. Below the aforementioned value of 10%, it is possible to prevent the adverse affections on the transmission characteristics as much as possible.

It is desired that the optical fiber core 1A sheathed with the communication cable 100 is characterized to have a mode field diameter (MFD) of 8.8 microns or less for a wavelength of 1.31 microns, a cable cutoff wavelength (λcc) of 1.26 microns or less and a screening level of 1.2% or less. In the communication cable 100 using the optical fiber core 11A having such characteristics, the transmission characteristics of the optical fiber core 11A can be kept in a satisfactory state even when the communication cable 100 is bent to a small radius (e.g., 15 mm). The hard resin layer 13aA outside of the optical fiber core 11A contains a filler of potassium titanate so that it is excellent in low shrink characteristics, an impact resistance and a lateral pressure resistance. With the filler being contained in the hard resin layer 13aA, another advantage is that the damage of the cylinder of an extruding machine can be prevented as much as possible at the extrusion shaping time. The hard resin layer 13aA is covered on its outer circumference with the protective layer 13bA having a lower modulus of elasticity than that of the hard resin layer 13aA.

When the communication cable 100 is to be bent, the edge portions 14aA on one side of the cut portions 14A of the hard resin layer 13aA start to contact with each other, and the edge portions 14aA on the other side leave each other, so that the communication cable 100 begins to be bent (as referred to FIG. 8). When this bend is further proceeded, the resistances (or the tensile resistances) of the two high-tension elements 101 and 101 and the protective layer 13bA act to make hard the more bend than a desired value. Thus, the buckling, kink and so on of the communication cable 100 can be prevented with the bend and the resistance being balanced, so that the bend can become regular.

FIG. 13(A) shows one example of a manufacturing process 200 of the communication cable 100 shown in FIG. 12. The high-tension elements 101 and 101 are let off two bobbins 201 and 201 located on the left end of the upstream side. After this, the optical fiber core 11A merges into the two high-tension elements 101 and 101at a fiber core bobbin 202. When this mergence is delivered to an extruding machine 203, a hard tube 13AA is so extruded from the extruding machine 203 as to sheathe the high-tension elements 101 and 101 and the optical fiber core 1A. The hard tube 13AA thus extruded is cooled in a first water tank 204 and a second water tank 205, and its diameter is measured by a measuring instrument 206. After this measurement, the hard tube 13AA passes through a capstan 207 to a cutting machine 208, in which it is spirally cut.

FIG. 13(B) shows an essential portion of the cutting machine 208 in an enlarged scale. This cutting machine 208 is equipped with a disc-shaped cutter 208A, and a pair of presser rollers 208B and 208B adjoining the cutter 208A. This cutter 208A and the presser rollers 208B and 208B are arranged in a state at a desired angle with respect to the longitudinal axis of the hard tube 13AA and the hard resin layer 13aA having the cut portions 14A formed, and the angle is the spiral angle of the cut portions 14A. The hard tube 13AA is held, when delivered into the cutting machine 208, by the paired presser rollers 208B and 208B, and the cut is formed in the hard tube 13AA by the cutter 208A. The cutter 208A and the presser rollers 208B and 208B are individually turned in the directions indicated by arrows, and are turned as a whole in the direction of arrow T around the hard tube 13AA (or the hard resin layer 13aA) thereby to form the spiral cut. In order to form circumferential cuts in the hard tube 13AA in place of the spiral cut, the cutter 208A and the presser rollers 208B and 208B are arranged at a right angle with respect to the longitudinal direction of the hard tube 13AA (or the hard resin layer 13aA) thereby to make a circumferential cut.

The hard resin layer 13aA having the spiral cut portion 14A formed is cooled in a third water tank 209 and is taken up on a take-up bobbin 212 through a wheel capstan 210 and a dancer roller 211. At the not-shown next step, moreover, the hard resin layer 13aA sheathing the optical fiber core 11A and the high-tension elements 101 and 101 is let off the take-up bobbin 212 and is sheathed on the outer circumference of the hard resin layer 13aA with the protective layer 13bA by the extruding machine. Here in the case of the communication cable in which highly tensile fibers, highly tensile strings or the like having a higher modulus of elasticity than that of the protective layer 13bA are sandwiched between the hard resin layer 13aA and the protective layer 13bA, it is desired that the highly tensile fibers, highly tensile strings and so on are arranged on the outer circumference of the hard resin layer 13aA. The communication cable 100 shown in FIG. 12 can be manufactured by the manufacturing process thus far described.

As described above, as an example of a communication cable according to the present, a loose type communication cable in which the optical fiber core and the outer circumference (coating layer) do not touch in contact with each other is explained. However, the present invention can be also applied to a communication cable in which the optical fiber core and the outer circumference (coating layer) touch in contact with each other.

Figure 14:
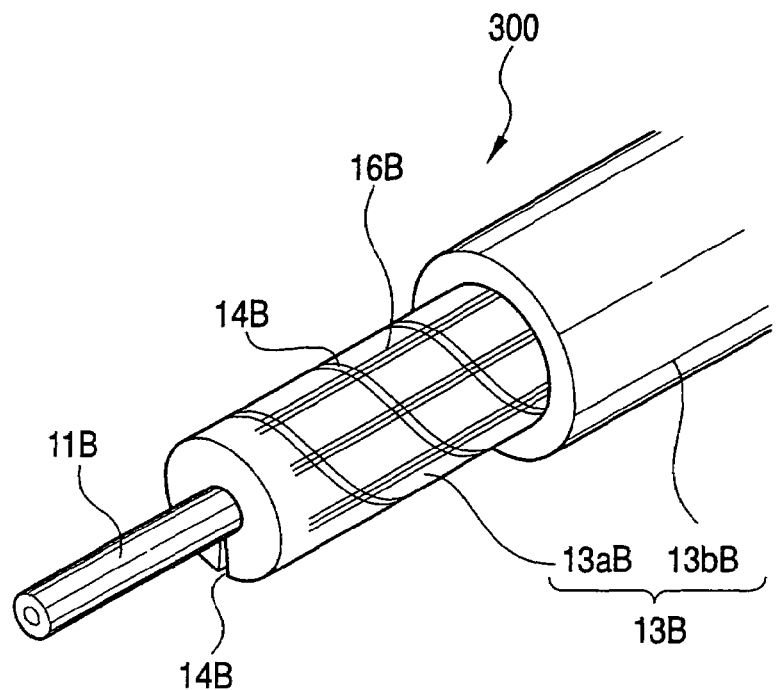
[FIG. 14]
Diagram for explaining another example of the communication cable of another embodiment of the invention.

FIG. 14 shows another embodiment of the communication cable according to the present invention of a communication cable in which the optical fiber core and the outer circumference (coating layer) touch in contact with each other. In the communication cable 300, the optical fiber core 11B touches in contact with the hard resin layer 13aB coating the outer circumference of the optical fiber core 11B, and a penetrating spiral cut portion 14B is formed on the hard resin layer 13aB. Further, the tensile strength fiber 16B is filled on the outer circumference of the hard resin layer 13aB, and the protective layer 13bB coats the hard resin layer 13aB and the tensile strength fiber 16B.

The communication cable 300 is made as follows. A hard tube is formed around the optical fiber core 11B as a coating layer by pushing mold, and after being cooled, a cut portion 14B is formed in the hard tube to form the hard resin layer 13aB. Then, the tensile strength fiber 16B is supplied, and the protective layer 13bB is formed around the hard resin layer 13aB and the tensile strength fiber 16B by pushing mold to make the communication cable 300.

In the communication cable 300 made as above, while the optical fiber core 11B and the hard resin layer 13aB touch in contact with each other, they do not touch in contact with each other at the cut portion 14B of the hard resin layer 13aB. Therefore, when the communication cable 300 is bent, it is easy to bend thereof to a desired bending diameter. However, when it is further bent, since a resistance against bending is generated owing to a contact force between the optical fiber core 11B and the hard resin layer 13aB, the tensile strength fiber 16B and the protective layer 13bB, it is difficult to bend thereof. Then, it is possible to prevent the communication cable 300 from buckling.

The communication cables 100, 300 shown in FIGS. 12 and 14 have the tubular or annular coating layer, but its shape should not be limited to that layer.

Figure 15:
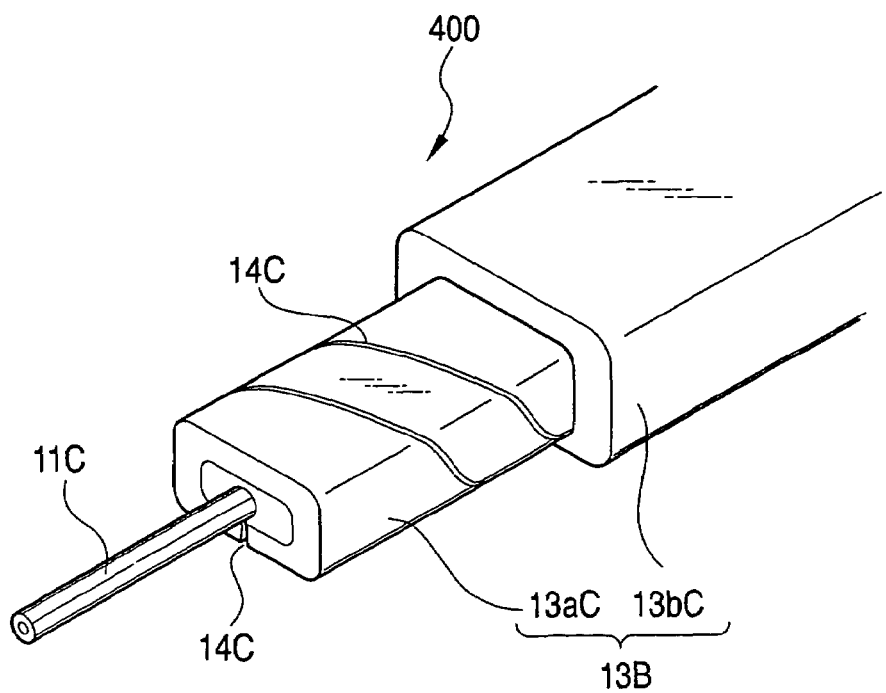
[FIG. 15]
Diagram for explaining another example of the communication cable of another embodiment of the invention.

FIG. 15 shows an example of a communication cable having a substantial rectangular shape. In the communication cable 400, the optical fiber core 11C is sheathed in the rectangle hard resin layer 13aC having a cut portion 14C, and it is also possible to sheathe the high-tension element and the like, if necessary.

The outer circumference of the hard resin layer 13aC is covered with a rectangular protective layer 13bC, and it is possible to arrange a tensile strength fiber and the like between the hard resin layer 13aC and the protective layer 13bC, if necessary. If the rectangular communication cable as above is used, it is possible to stably arrange the communication cables on the wall or the floor for the indoor wiring. Further, a shape of the communication cable is not limited to a rectangle. For example, the present invention can be also applied to a communication cable having a polygonal sectional shape.

Further, by a communication cable according to the present invention, even if the coating layer is single and has the cut portions, the end portions of the cut portions contact with each other so that they can prevent the coating layer from being excessively bent.

The invention has been described on the embodiment, in which the armor is formed in the loose state directly on the outer circumference of the optical fiber core. By forming only the armor beforehand in a communication wire protecting tube, however, the optical fiber core could also be later inserted into the protecting tube. The construction of the communication wire protecting tube can be illustrated as a tubular member having the shape, as shown in FIG. 10 and FIG. 11, and excepting the optical fiber core.

Figure 16A:
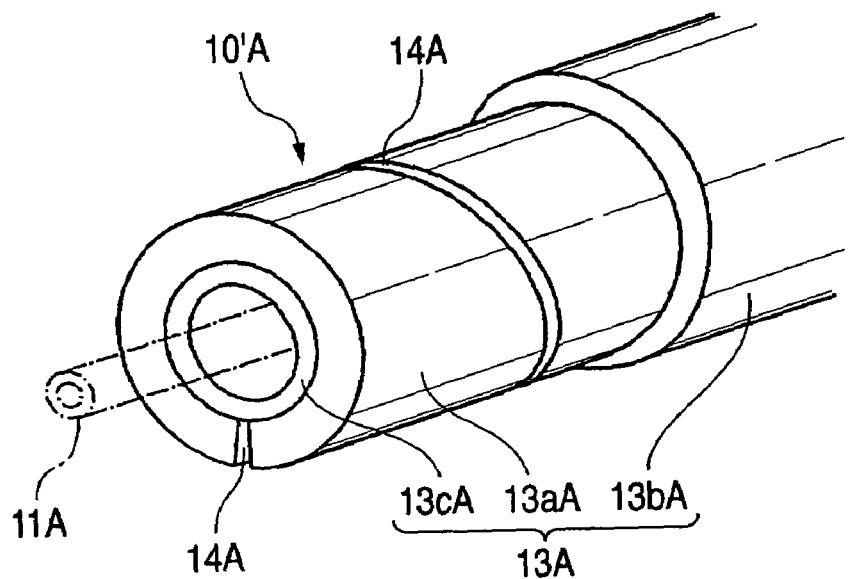
[FIG. 16]
Diagrams for explaining examples of communication wire protecting tubes of other embodiments of the invention.
Figure 16B:
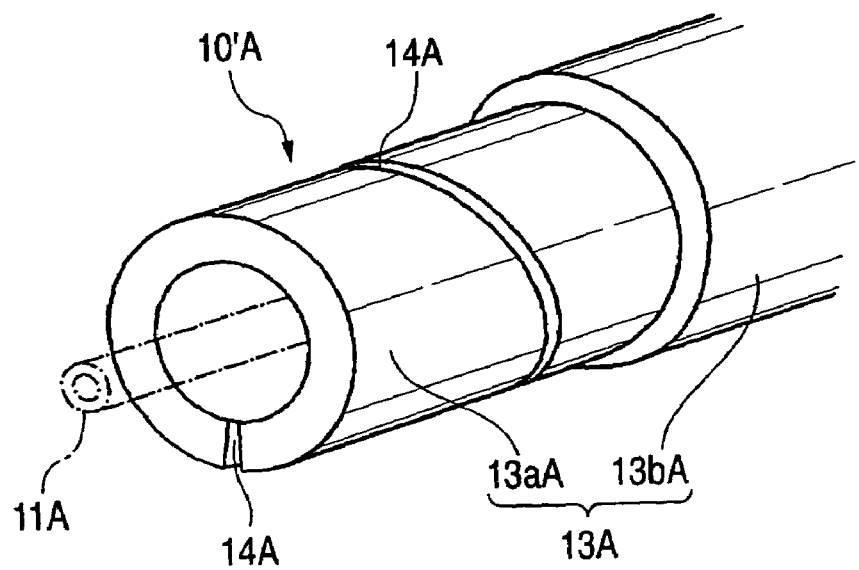
Figure 17A:
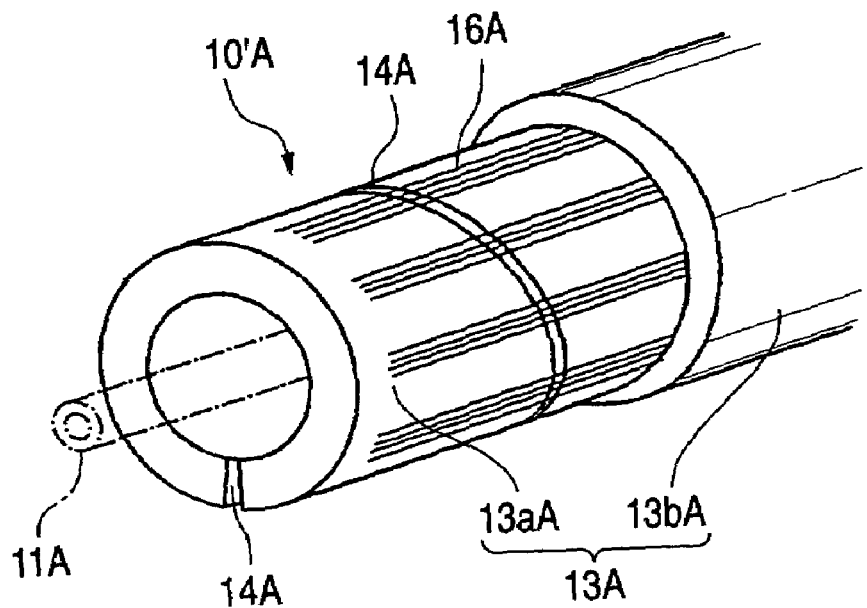
[FIG. 17]
Diagrams for explaining examples of communication wire protecting tubes of other embodiments of the invention.
Figure 17B:
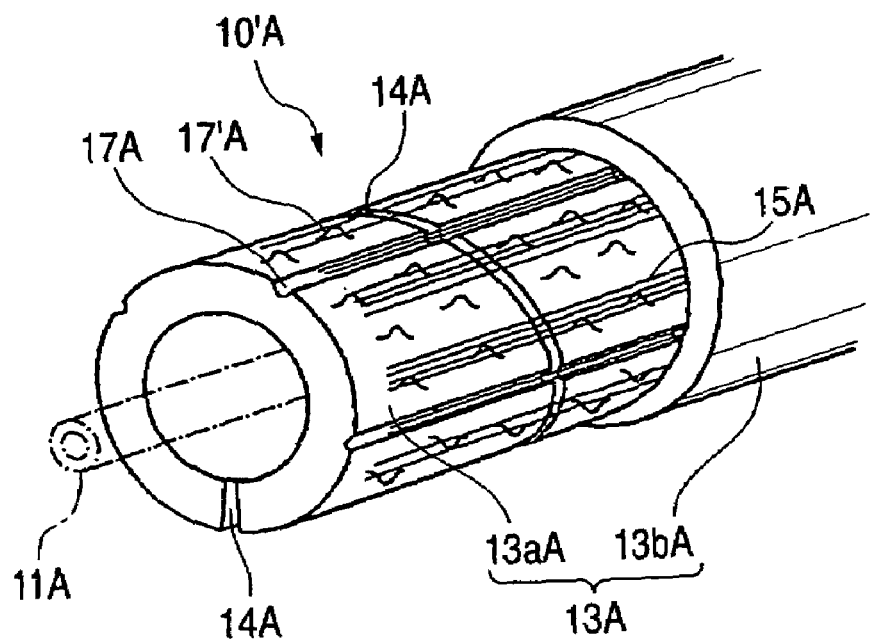

FIG. 16 and FIG. 17 are diagrams showing another embodiment of the communication cables described above. FIG. 16(A) is a diagram showing an embodiment having the soft resin layer on the inner side of the hard resin layer; FIG. 16(B) is a diagram showing an embodiment not having the soft resin layer on the inner side of the hard resin layer; FIG. 17(A) is a diagram showing an embodiment, in which the tensile strength fibers are arranged between the hard resin layer and the protective layer; and FIG. 17(B) is a diagram showing an embodiment for preventing the displacement of the tensile strength fibers by corrugating the outer face of the hard resin layer. The numerals in these Figures designate the same components as those used in FIG. 10 and FIG. 11 so that their description is omitted.

In the mode of the embodiment shown in FIG. 16(A), a communication wire protecting tube 10'A has the soft resin layer 13cA on the inner side of the hard resin layer 13aA. In this case: the soft resin layer 13cA is formed in a circular tube shape; the hard resin layer 13aA harder than the soft resin layer 13cA is formed on the outer circumference of the latter; and the crosswise or spiral cut portion 14A is formed in the hard resin layer 13aA. This cut portion 14A is formed continuously in the longitudinal direction with a depth to reach the soft resin layer 13cA on the inner side. On the outer face of the hard resin layer 13aA, moreover, there is formed the protective layer 13bA, which is made of a softer resin than the hard resin layer 13aA.

In the mode of the embodiment shown in FIG. 16(B), the communication wire protecting tube 10' has the soft resin layer 13c on the inner side of the hard resin layer 13a. In this case, the hard resin layer 13a is formed in a circular tube shape, and the spiral cut portion 14A is formed in the hard resin layer 13a. This cut portion 14A is formed continuously in the longitudinal direction with a depth to reach the radially inner face. On the outer face of the hard resin layer 13aA, moreover, there is formed the protective layer 13bA, which is made of a softer resin than the hard resin layer 13aA.

In the mode of the embodiment of the communication wire protecting tube 10'A shown in FIG. 17(A), the tensile strength fibers 16A are arranged between the hard resin layer 13aA and the protective layer 13bA. The tensile strength fibers 16A are disposed by various methods such as by arranging them along the longitudinal direction of the hard resin layer 13aA or by winding or braiding them in the longitudinal direction.

In the mode of the embodiment of the communication wire protecting tube 10'A shown in FIG. 17(B), the hard resin layer 13aA has its outer face corrugated to suppress the displacement of the tensile strength fibers 16A. Here in FIG. 17(A) and FIG. 17(B), the soft resin layer is not formed on the inner side of the hard resin layer 13aA. However, this embodiment could also be applied to the shape having the soft resin layer.

The aforementioned communication wire protecting tubes 10'A shown in FIG. 16 and FIG. 17 are enabled to prevent the bend by the constructions and actions similar to those of the embodiments of the communication cable described with reference to FIG. 8 to FIG. 11. Moreover, the communication wire protecting tubes 10'A could also be used as the communication cable by laying them beforehand in the room or the like and by inserting the communication wire such as the optical fiber or the signal conductor into them. The insertion of the communication wire (e.g., the optical fiber core 11A) into the communication wire protecting tubes 10'A could be done by using the well-known various wiring methods.

The invention claimed is:

1. A communication cable comprising:
   a communication wire; and
   an armor including at least two synthetic resin layers and protecting the communication wire in a loose state, wherein
   a hard resin layer of the armor has a crosswise or spiral annular groove continuous in the longitudinal direction to reach a radially inner face,
   an outermost layer of the armor is formed of a protective layer made of a softer resin than the hard resin layer, and
   when the communication wire is to be bent, adjoining edge portions of the annular groove come into contact with each other so that the communication wire may be prevented from being bent to a predetermined or smaller bend radius.

2. The communication cable according to claim 1, wherein
   the innermost layer of the armor is the hard resin layer.

3. The communication cable according to claim 1 or 2, further comprising:
   tensile strength fibers on the outer face of the hard resin layer.

4. The communication cable according to claim 3, wherein
the hard resin layer has its outer face corrugated to suppress the displacement of the tensile strength fibers.

5. The communication cable according to claim 4, wherein
the communication wire is an optical fiber core.

6. A communication wire protecting tube comprising:
at least two synthetic resin layers that protect a communication wire in a loose state, wherein
a hard resin layer of the protecting tube has a crosswise or spiral annular groove continuous in the longitudinal direction to reach the radially inner face, and
an outermost layer of the protecting tube is formed of a protective layer made of a softer resin than the hard resin layer, and
when the protecting tube is to be bent, adjoining edge portions of the annular groove come into contact with each other so that the communication wire may be prevented from being bent to a predetermined or smaller bend radius.

7. The communication wire protecting tube according to claim 6, wherein
the innermost layer of the protecting tube is the hard resin layer.

8. The communication wire protecting tube according to claim 6 or 7, further comprising:
tensile strength fibers on the outer face of the hard resin layer.

9. The communication wire protecting tube according to claim 8, wherein
the hard resin layer has its outer face corrugated to suppress the displacement of the tensile strength fibers.

10. The communication wire protecting tube according to claim 6, wherein
the hard resin layer has a cut width of 10% or less of the width of the portion having no cut.

11. The communication wire protecting tube according to claim 10, further comprising:
fibers or strings having a higher modulus of elasticity than that of the protective layer arranged between the hard resin layer and the protective layer sheathing the outer circumference of the hard resin layer.

12. The communication wire protecting tube according to claim 11, wherein
longitudinal grooves are formed in the outer circumference of the hard resin layer.

13. The communication wire protecting tube according to claim 12, wherein
the hard resin layer and/or the protective layer have a generally rectangular shape in section.

14. A communication cable comprising:
a communication wire sheathed in the communication wire protecting tube according to claim 13.

15. The communication cable according to claim 14, wherein
the communication wire is an optical fiber core.

16. The communication cable according to claim 15, further comprising:
highly tensile fibers arranged around the optical fiber core.

17. The communication cable according to claim 15, wherein
a mode field diameter (MFD) is 8.8 microns or less for a wavelength of 1.31 microns, a cable cutoff wavelength ($\lambda cc$) is 1.26 microns or less and a screening level is 1.2% or less.

* * * * *